JOSEPH MASON BARRON
INVENTOR
BY HIS ATTORNEY

Patented July 3, 1945

2,379,471

UNITED STATES PATENT OFFICE 2,379,471

COMBINATION CATALYTIC AND THERMAL CRACKING

Joseph Mason Barron, Port Arthur, Tex., assignor to The Texas Company, New York, N. Y., a corporation of Delaware Application July 2, 1943, Serial No. 493,204

3 Claims. (Cl. 196—49)

This invention relates to a combination catalytic and thermal method of cracking hydrocarbon oils for the production of gasoline or motor fuel.

The invention contemplates a process in which hydrocarbons are subjected to thermal cracking in a reaction zone in which liquid and vapors are in countercurrent contact at cracking temperature and in which the separated vapors from the thermal reaction zone are subjected to catalytic cracking. In accordance with the invention a relatively light stock undergoing cracking is introduced to the lower portion of a thermal reaction zone and a higher boiling stock is introduced into an upper portion of the reaction zone to flow countercurrently to the upwardly rising vapors therein and the separated vapors are passed directly to a catalytic cracking step. The refluxing to which the vapors are subjected while undergoing cracking in the countercurrent cracking zone functions to prevent the delivery to the subsequent catalytic cracking zone of certain heavy potential carbon-forming polymers with the result that the vapors from the countercurrent cracking zone may be subjected directly to catalytic cracking without injurious deposition of carbon on the catalyst. It is not necessary to subject the vapors from the reaction zone to any intervening dephlegmation in order that the vapors may be in a suitable condition for catalytic cracking. By carrying on a thermal cracking step in which the vapors undergoing cracking are dephlegmated with the higher boiling stock, the carbon residue of the vapor stream may be kept sufficiently low that the vapors may be contacted directly with the catalyst and subjected to catalytic cracking.

In accordance with the invention a lower boiling or condensate stock, such as gas oil, kerosene and naphtha, is passed through a heating zone wherein it is subjected to a cracking temperature and the heated effluent, preferably largely or entirely in vapor form, is directed to the lower portion of a thermal reaction zone; while higher boiling or residual stock is introduced to an upper portion thereof with the result that the upwardly rising vapors undergoing cracking are dephlegmated with the higher boiling stock and the dephlegmated vapors, at a temperature adapted for catalytic cracking, are contacted with a catalyst and subjected to catalytic cracking.

The invention will be more clearly understood from the following description and from the accompanying drawings in which like elements are designated by the same reference numerals and wherein.

Figure 1:
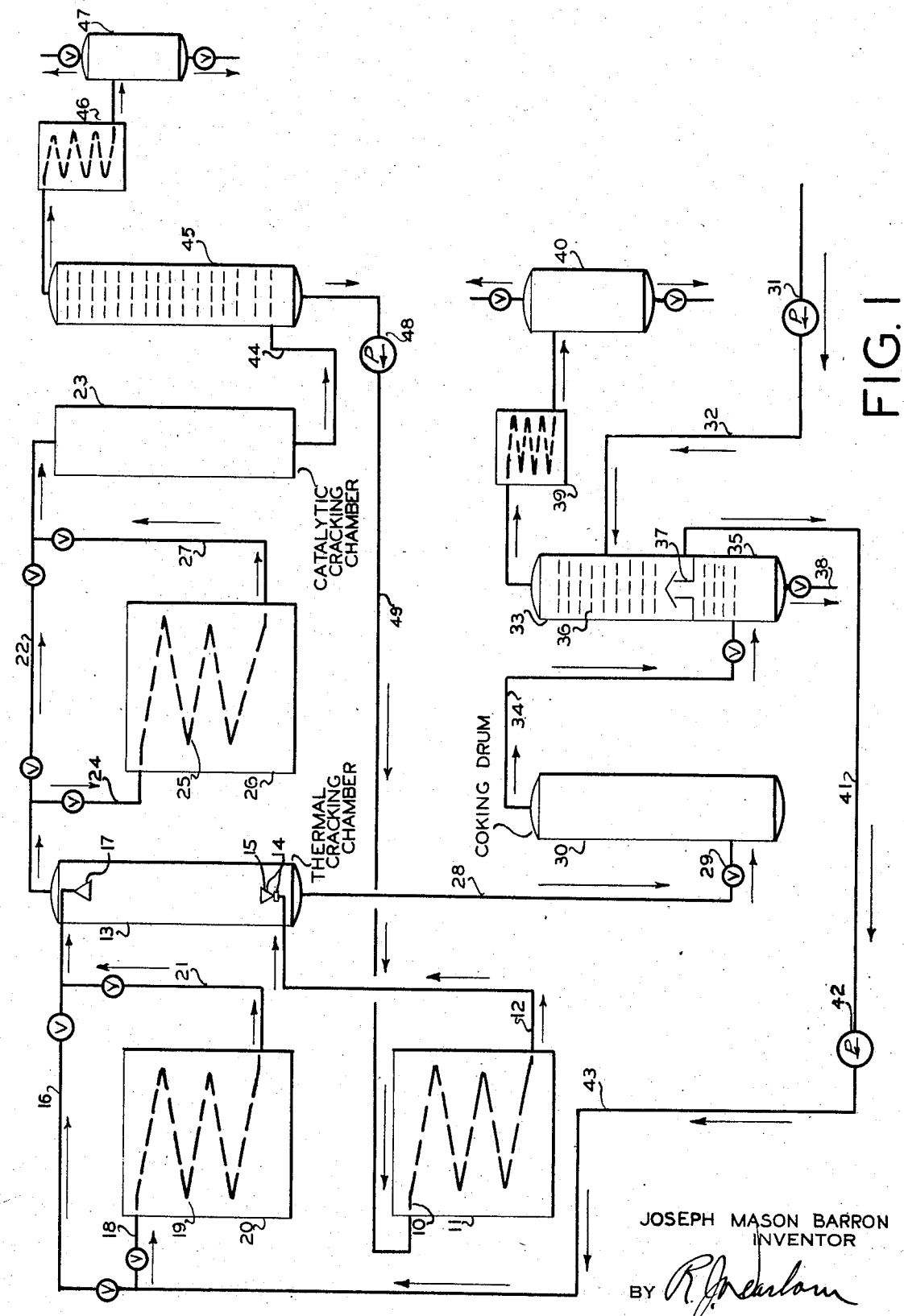
Fig. 1 is a diagrammatic drawing or flow diagram which illustrates a preferred embodiment of the apparatus or system adapted for carrying out my improved combination catalytic and thermal cracking process.
Figure 2:
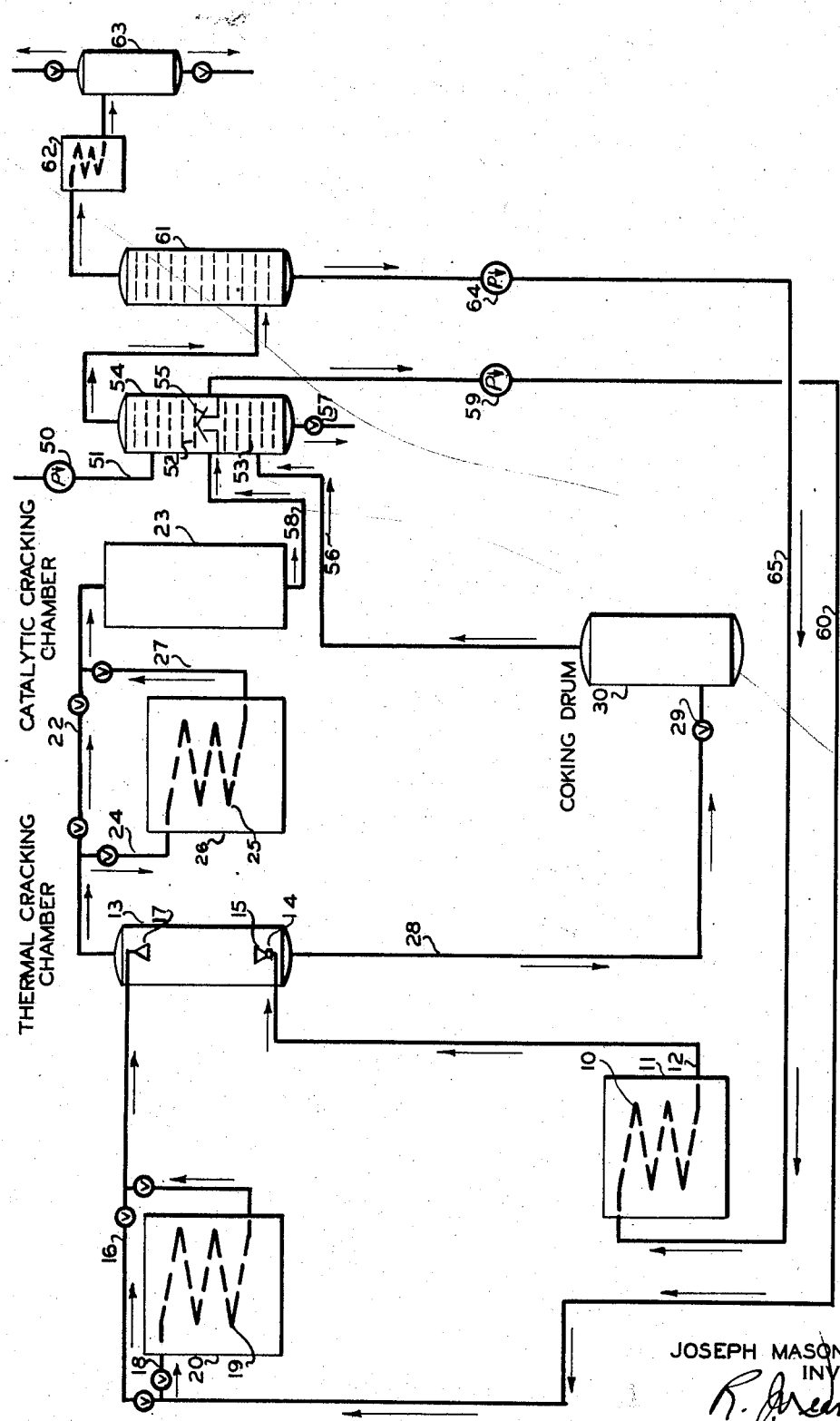
Figs. 2 and 3 are modifications thereof.

Referring generally to the three figures of the drawings, the lower boiling stock, such as gas oil, kerosene and naphtha, is heated in the heating coil 10 disposed in a furnace 11 adapted to heat the oil to a cracking temperature. The heated effluent passes through a transfer line 12 to a reaction chamber 13 which is vertically disposed and heat-insulated. The transfer line preferably extends within the lower portion of the reaction chamber and terminates in an enlarged pipe or section 14 through which the heated products are discharged in an upward direction against a baffle or spreader 15. In practice with a three-inch transfer line, the element 14 may well be composed of a six-inch pipe. The products passing from the coil 10 to the reaction chamber 13 will consist largely, if not entirely, of vapors and gases and upon being discharged through the enlarged pipe 14 against the baffle 15 an efficient diffusion of the vapors and gases is accomplished. A higher boiling or black oil stock such as topped or reduced crude is introduced to an upper portion of the reaction chamber 13 through a line 16 which preferably extends within the reaction chamber and terminates in a distributor or spray nozzle 17. The spray 17 is arranged to spray the liquid oil in a downward direction through the chamber so as to bring the liquid into intimate contact with the rising vapors. It is desirable to have an unobstructed space between the distributor 15 and spray nozzle 17 free from baffles or any other contact elements upon which coke might deposit. The black oil or residual stock may be introduced to the reaction chamber 13 directly from various sources hereinafter explained or such stock, as shown in Figs. 1 and 2, may be directed through a branch line 18 to a heating coil 19 disposed in a furnace 20 and the heated effluent discharged through a transfer line 21 and passed thence through line 16 to the spray 17. The heating of the higher boiling stock for the Fig. 3 operation is described hereinafter.

Separation of vapors from liquid residue takes place in the reaction chamber 13 and the separated vapors pass through a vapor line 22 to a catalytic cracking zone 23 wherein the vapors are brought into contact with a cracking catalyst and subjected to catalytic cracking. By reason of the countercurrent method of cracking conducted in the thermal reaction chamber 13, a sufficiently high temperature may be maintained therein without coking that the withdrawn vapors are at a temperature suitable for catalytic cracking. In cases, however, where it is desired to employ an increased temperature in the catalytic cracking step, the vapors from the reaction chamber 13 or a portion thereof may be diverted through a branch line 24 to a heating coil 25 disposed in a furnace 26 wherein the temperature may be increased the desired amount and the heated vapors passed thence through a line 27 to the line 22 and thence to the catalytic cracking zone or chamber 23.

The catalyst consists advantageously of a synthetic silica-alumina type of catalyst. Various acid-treated and metal-substituted clays such as the Super-Filtrols and acid-treated and metal-substituted natural or artificial zeolites, such as the artificial zeolite known as Doucil may be employed. Various metals such as uranium, molybdenum, manganese, lead, zinc, zirconium, nickel and the like, may be substituted in the clays or zeolites. Likewise, the combination of certain acid-treated active clays of the character of Filtrol, together with added proportions of alumina or silica or both may be employed. Alumina alone may be used under certain conditions. The synthetic alumina catalysts can be improved by the addition of other constituents such as zirconium oxide or molybdenum oxide. The catalyst may be provided as a stationary bed through which the vapors pass, or the vapors may pass over a continuously moving mass of granular catalyst, or the catalyst in a finely divided, comminuted or powdered form may be suspended in the vapors being introduced into the reaction chamber, or suspended in a gaseous medium whereby the catalyst is carried along with the vapors through the reaction zone. In the fixed bed method of catalytic cracking a plurality of catalyst chambers may be used so that the catalyst may be regenerated without interrupting the continuity of the complete process, and in the case of the moving catalyst, the catalyst may be removed from the contacting reaction zone to a regenerating zone.

As shown in Figs. 1 and 2 liquid residue from the reaction chamber 13 is withdrawn through a line 28 and pressure-reducing valve 29 to a coking chamber 30. By maintaining temperatures in excess of 900° F. in the reaction chamber 13 and by preventing the accumulation of liquid residue therein, the liquid residue may be readily converted to coke solely by means of its contained heat. In the Fig. 3 operation the bottoms from reaction chamber 13 may be passed through a line 28 to a coking drum (not shown) for autogenous coking or conducted directly to storage.

In the system of Fig. 1 charging stock such as topped or reduced crude is directed by a pump 31 through a line 32 to a fractionator 33 which receives the vapors from the coking drum 30 through a vapor line 34. The fractionator is formed with a primary dephlegmating section 35, which receives the vapors from the coking drum, and a secondary fractionating section 36 with an intervening trap-out tray 37. The primary dephlegmate or polymer fuel is withdrawn from section 35 through a line 38. The charging stock is preferably introduced into the section 36 to dephlegmate the vapors therein, resulting in the formation of a mixture of reflux condensate and unvaporized charging stock which collects in the tray 37. The overhead vapors from the fractionator pass to a condenser 39 and distillate accumulator or gas separator 40. The mixture from the tray 37 is withdrawn through a line 41 and is directed by a pump 42 through line 43 thence either through line 16 and spray 17 into the upper portion of the reaction chamber 13 or is passed through branch line 18 and heating coil 19 thence to the reaction chamber. When the residuum mixture is routed through the heating coil 19 it may be heated at cracking temperatures and subjected to visbreaking.

The products of the catalytic cracking are discharged from the catalytic reaction zone 23 through a line 44 to a fractionator 45 wherein the products are fractionated to separate the higher boiling products from naphtha or gasoline vapors which pass overhead to a condenser 46 and distillate accumulator or gas separator 47. The bottoms or higher boiling fractions from the fractionator 45 are directed by a pump 48 through a line 49 to the heating coil 10 wherein the oil is subjected to cracking temperatures such as 1000–1050° F. The effluent from the heating coil 10, consisting essentially of vapors and gases, is discharged into the lower portion of the thermal reaction chamber 13 wherein the cracking of the vapors is continued while being dephlegmated with the residual oil which is itself subjected to cracking or visbreaking in the reaction chamber. The reaction chamber is maintained under superatmospheric pressures, such as 200–600 p. s. i., and at cracking temperatures upwards of 900° F. Liquid is prevented from accumulating in the reaction chamber, the liquid being rapidly withdrawn and subjected to autogenous coking in the coking drum 30. The overhead vapors from the reaction chamber are passed directly to the catalytic cracking zone 23 or a portion of all of the vapors is routed through heating coil 25 thence to the catalytic cracking zone 23. In contact with the catalyst, a further conversion into lower boiling constituents occurs and reforming reactions, particularly isomerization of olefins, take place which function to increase the anti-knock quality of the gasoline produced in the thermal cracking operation. Since it is feasible to remove the vapors from the thermal reaction chamber 13 with temperatures as high as about 930° F. therein, the vapor stream may require no further heating for the catalytic cracking step. However, in cases where higher temperatures are desired for the catalytic cracking, the vapor stream may be by-passed through the heater to obtain the additional temperature desired, or a portion only of the vapors may be by-passed through the heater to accomplish the necessary heating of the total vapor stream. In the production of aviation gasoline it is advantageous to carry on the catalytic cracking at a temperature around 850° F., which temperature may be readily maintained in the catalytic reaction zone without adding any heat to the vapors. The catalytic cracking step is most advantageously conducted at pressures lower than those best adapted for the thermal cracking step and the pressure in the reaction chamber 23 is accordingly stepped down to the degree desired which is preferably below 100 p. s. i.

In the system of Fig. 2 vapors from the coking an catalytic cracking operations are subjected to dephlegmation with charging stock. Charging stock, such as topped or reduced crude, is introduced by a pump 50 through a line 51 to a fractionator 52. The fractionator is formed with a primary dephlegmating section 53 and an upper dephlegmating section 54 separated by a trap-out tray 55. The vapors from the coking drum pass through a vapor line 56 to the primary dephlegmator 53 from which the primary dephlegmate or polymer fuel is withdrawn through line 57. The dephlegmated vapors pass to the upper fractionating section 54 which receives the catalytically cracked products through a line 58. The upwardly rising vapors are subjected to dephlegmation with the topped or reduced crude charging stock and the mixture of reflux condensate and unvaporized crude residue is withdrawn from the tray 55 and directly by a pump 59 through a line 60 thence either through line 16, or through the heater 19 to the spray 17 in the upper portion of the thermal reaction chamber 13. Uncondensed vapors from the fractionator 54 pass to a subsequent fractionator 61 therein a further fractionation takes place to separate reflux condensate from gasoline or naphtha vapors which pass overhead to a condenser 62 and distillate accumulator or gas separator 63. The reflux condensate from fractionator 61 is directed by a pump 64 through a line 65 to the heating coil 10 thence to the lower portions of the thermal reaction chamber 13. The overhead vapors from the reaction chamber 13 are subjected to catalytic cracking in chamber 23. The conditions for the thermal and catalytic cracking operations are the same as have been outlined for the Fig. 1 operation.

Figure 3:
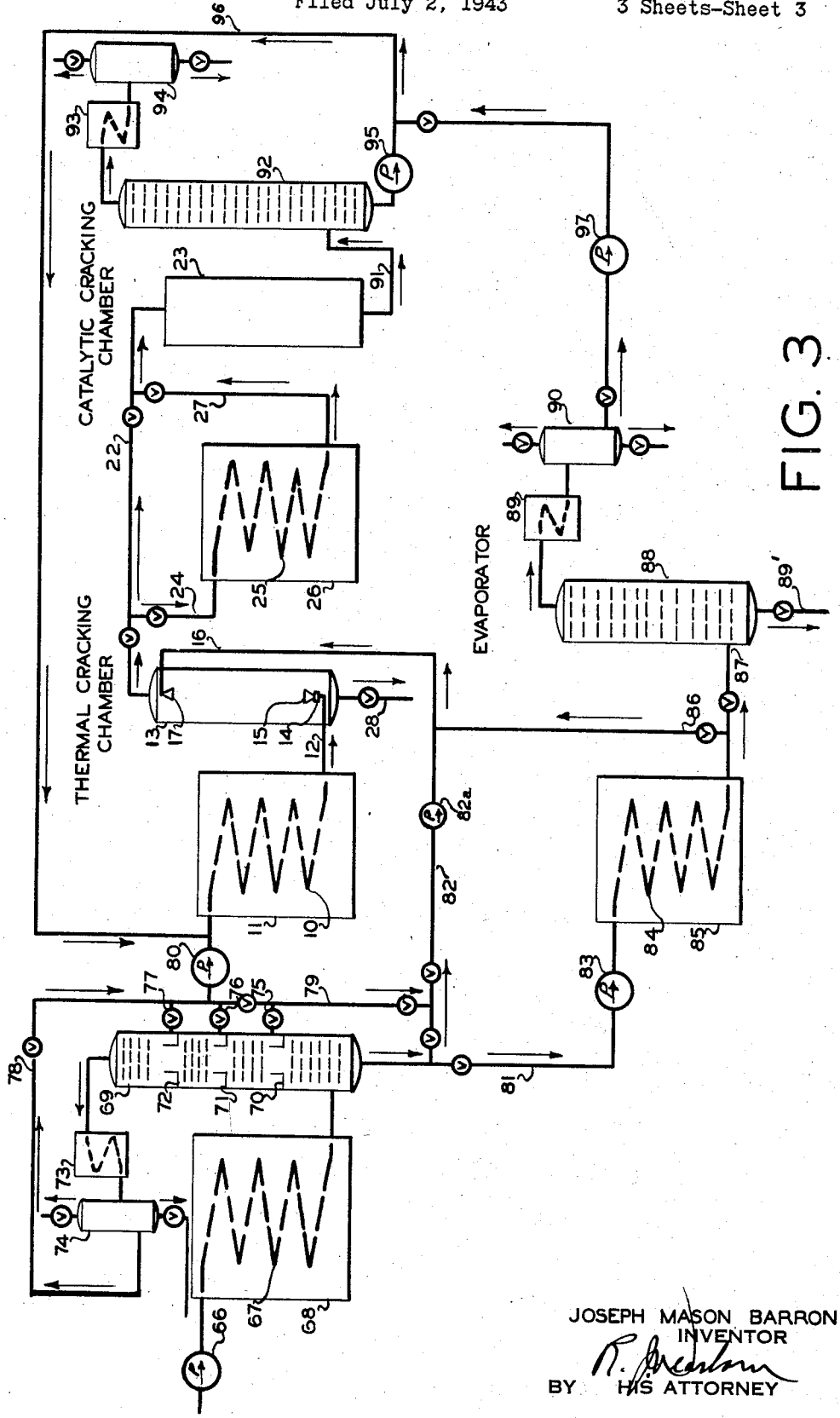

In the Fig. 3 operation a crude petroleum charging stock is directed by a pump 66 to a heating coil 67 disposed in a furnace 68 wherein the oil is heated to desired distilling temperature and discharged into a crude oil fractionator 69 wherein separation of vapors from liquid residue occurs and wherein the vapors are subjected to fractionation. In the fractionator the vapors are fractionated to produce the desired fractions which may be collected as condensates in a plurality of trays such as 70, 71 and 72 as well as an overhead vapor fraction which may be passed to a condenser 73 and a distillate accumulator 74. Normally, when the crude contains light gasoline constituents, it is preferable to flash off the light fractions such as those boiling up to 250–300° F. endpoint by heat exchange with hot cracked products of the system and to charge the topped crude to the heating coil 67. In this case the overhead fraction may be heavy naphtha, the fraction in tray 72 may be kerosene and the fractions in trays 71 and 70 light and heavy gas oils, respectively. Draw-off lines 75, 76 and 77 are provided for withdrawing condensates from trays 70, 71 and 72 respectively and a draw-off line 78 is provided for withdrawing distillate from receiver 74. These draw-off lines are manifolded in a common line 79 to the intake of a pump 80 so that any or all of these fractions may be directed to the cracking coil 10. The straight-run charge to this cracking coil is preferably heavy naphtha or light gas oil or a mixture of heavy naphtha and light gas oil. The kerosene cut may be included in the naphtha or gas oil charge or it may be withdrawn from the system. Residue is withdrawn from the crude fractionator through a line 81. A branch line 82 and pump 82a serves to conduct the residue to line 16 for introduction to the upper portion of the thermal reaction chamber 13. The line 79 communicates with the line 82 so that gas oil fractions may also be directed to the upper portion of the thermal reaction chamber. In an alternative operation, the residue withdrawn through line 81 is directed by a pump 83 to a heating coil 84 disposed in a furnace 85 wherein the residue is preheated to the extent desired, being preferably heated to a cracking temperature and subjected to cracking or visbreaking. The outlet from the heating coil 84 is branched so that the effluent from the coil may be directed either through branch line 86 to lines 82 and 16 or through a branch line 87 to an evaporator 88. Gas oil fractions, such as withdrawn through line 75, may be added to the residue conducted to the cracking of visbreaking coil 84. In the evaporator 88 separation into vapors and residue occurs, the residue being withdrawn through a line 89'. When the effluent from the heating coil 84 is passed to the evaporator 88 gas oil constituents from the crude distillation, particularly a heavy gas oil fraction as withdrawn through line 75, may be directed through line 16 to the reaction chamber 13 or the bottoms from the evaporator 88, withdrawn through line 89', may be directed to the line 16 through a line (not shown). The vapors from the evaporator 88 are condensed in a condenser 89 and collected in a distillate receiver or gas separator 90. In the reaction chamber 13 of the Fig. 3 system, thermal cracking is carried on in a manner similar to that described for the systems of Figures 1 and 2, and the overhead vapors are similarly subjected to catalytic cracking. The products of the catalytic cracking pass through a line 91 to a fractionator 92 wherein the higher boiling products are separated from gasoline or naphtha vapors which pass to a condenser 93 and receiving drum or gas separator 94. The bottoms from fractionator 92 are directed by a pump 95 through a line 96 to the cracking coil 10 so that the higher boiling products of the catalytic cracking are subjected to thermal conversion together with the straight-run naphtha or gas oil constituents and the visbreaker distillate from receiver 90 may also be subjected to thermal cracking in the coil 10 by being withdrawn by a pump 97 and combined with the products flowing in line 96.

In a preferred operation with the system of Fig. 3 the straight-run charging stock to the coil 10 consists of naphtha and light gas oil and this straight-run fraction, together with the visbreaker distillate and higher boiling products from the catalytic cracking operation, is subjected to cracking conditions in the coil 10 adapted to effect thermal reforming of the gasoline constituents; while the crude residue is subjected to visbreaking in the coil 84 and passed to the evaporator 88 and heavy gas oil from tray 70 is sent to the upper portion of the thermal reaction chamber 13 for cracking under countercurrent conditions with the hot vapors from the coil 10.

In an example of the invention, a petroleum residual stock is delivered to the upper part of the thermal reaction chamber at a temperature of 800° F. and recycled gas oil from the catalytic cracking step is delivered from the thermal cracking coil at a temperature of 1020° F. and introduced to the lower part of the reaction chamber. The reaction chamber is maintained under a pressure of 400 p. s. i. with a temperature approximating 930° F. in the lower part of the chamber. Vapors are removed at a temperature of 915° F. and subjected to catalytic cracking in contact with a synthetic composite comprising precipitated silica and alumina at a temperature of about 860° F. under a pressure of 75 p. s. i. In a second example, the vapors from the thermal reaction chamber, withdrawn at a temperature of 915° F., are heated to a temperature of 940° F. and then contacted with the silica-alumina catalyst at temperatures approximating 875° F. under a pressure of 75 p. s. i. In each case residue is withdrawn from the thermal reaction chamber at a temperature of 930° F. and flashed to coke by contained heat under a pressure of 50 p. s. i. Similar conditions of operation are applicable when combining straight-run gas oil with gas oil from the catalytic cracking step for passage through the thermal cracking coil.

Although a preferred embodiment of the invention has been described herein, it will be understood that various changes and modifications may be made therein, while securing to a greater or less extent some or all of the benefits of the invention, without departing from the spirit and scope thereof.

I claim:

1. In the combination thermal and catalytic cracking of hydrocarbon oils the process that comprises passing hydrocarbon oil through a heating zone wherein it is heated to a cracking temperature and subjected to thermal cracking, introducing the resultant heated products to the lower portion of a vertically disposed reaction chamber wherein separation of vapors from liquid residue takes place, introducing higher boiling hydrocarbon oil to the upper portion of the vertically disposed reaction chamber to flow countercurrently to the upwardly rising vapors therein, maintaining a cracking temperature in said reaction chamber to effect thermal cracking, removing the separated vapors at a cracking temperature, contacting the vapors with a catalyst and subjecting them to catalytic cracking, withdrawing residue from said reaction chamber and subjecting it to coking, subjecting the evolved vapors from the coking operation to a primary dephlegmation, directing the dephlegmated vapors and the catalytically cracked products to a fractionating zone, introducing a residual charging stock to said fractionating zone, withdrawing a resultant mixture of high boiling reflux condensate and unvaporized residual stock, utilizing said mixture as the hydrocarbon oil introduced to the upper portion of the aforesaid reaction chamber, subjecting the vapors from said fractionating zone to further fractionation to separate a reflux condensate from lower boiling products and directing said reflux condensate to the aforesaid heating zone.

2. In the combination thermal and catalytic cracking of hydrocarbon oils the process that comprises passing hydrocarbon oil through a heating zone wherein it is heated to a cracking temperature and subjected to thermal cracking, introducing the resultant heated products to the lower portion of a vertically disposed reaction chamber wherein separation of vapors from liquid residue takes place, introducing higher boiling hydrocarbon oil to the upper portion of the vertically disposed reaction chamber to flow countercurrently to the upwardly rising vapors therein, maintaining a cracking temperature in said reaction chamber to effect thermal cracking, removing the separated vapors at a cracking temperature, contacting the vapors with a catalyst and subjecting them to catalytic cracking, withdrawing residue from said reaction chamber and subjecting it to coking, subjecting the evolved vapors from the coking operation to a primary dephlegmation, directing the dephlegmated vapors and the catalytically cracked products to a fractionating zone, introducing a residual charging stock to said fractionating zone, withdrawing a resultant mixture of high boiling reflux condensate and unvaporized residual stock, passing said mixture through a heating zone and utilizing the heated mixture as the hydrocarbon oil introduced to the upper portion of the aforesaid reaction chamber, subjecting the vapors from said fractionating zone to further fractionation to separate a reflux condensate from lower boiling products and directing said reflux condensate to the first-mentioned heating zone.

3. In the combination thermal and catalytic cracking of hydrocarbon oils the process that comprises passing hydrocarbon oil through a heating zone wherein it is heated to a cracking temperature and subjected to thermal cracking, introducing the resultant heated products to the lower portion of a vertically disposed reaction chamber wherein separation of vapors from liquid residue takes place, introducing higher boiling hydrocarbon oil to the upper portion of the vertically disposed reaction chamber to flow countercurrently to the upwardly rising vapors therein, maintaining a cracking temperature in said reaction chamber to effect thermal cracking therein, withdrawing the separated vapors at a cracking temperature, contacting the vapors with a catalyst and subjecting them to catalytic cracking, withdrawing residue from said reaction chamber and subjecting it to coking, directing evolved vapors from the coking operation and the catalytically cracked products to a fractionating zone, introducing a residual charging stock to said fractionating zone to dephlegmate the vapors therein, withdrawing a resultant mixture of high boiling reflux condensate and unvaporized residual stock and utilizing said mixture as the hydrocarbon oil introduced into the upper portion of the aforesaid reaction chamber, subjecting the vapors from said fractionating zone to further fractionation to separate reflux condensate from lower boiling products and directing said reflux condensate to the aforesaid heating zone.

JOSEPH MASON BARRON.